United States Patent [19]

Chen

[11] 4,246,159

[45] Jan. 20, 1981

[54] LUBRICANT FILLERS IN A DISCRETE PHASE

[75] Inventor: John H. Chen, Wyomissing, Pa.

[73] Assignee: The Polymer Corporation, Reading, Pa.

[21] Appl. No.: 67,377

[22] Filed: Aug. 17, 1979

[51] Int. Cl.³ .............................................. C08K 5/07
[52] U.S. Cl. .............................. 260/32.8 N; 252/12; 260/34.2; 260/37 N
[58] Field of Search ............. 260/32.8 N, 34.2, 42.53, 260/37 N; 252/12

[56] References Cited

U.S. PATENT DOCUMENTS

| | | | |
|---|---|---|---|
| 3,252,905 | 5/1966 | Schaeffer | 260/31.8 R |
| 3,458,596 | 7/1969 | Faigle | 525/184 |
| 4,100,245 | 7/1978 | Horikawa et al. | 252/12 |

Primary Examiner—Lewis T. Jacobs
Attorney, Agent, or Firm—Richard O. Church

[57] ABSTRACT

A method for incorporating a low melting lubricant filler in a polymeric matrix by mixing the lubricant filler with a monomer or polymer precursor while the filler and the monomer or precursor are in the liquid phase and subsequently polymerizing the mixture. The polymerizable mixture is prepared using nonintensive mixing to preserve the discrete phase of the lubricant filler.

9 Claims, No Drawings

LUBRICANT FILLERS IN A DISCRETE PHASE

BACKGROUND OF THE INVENTION

1. Field of the Invention

This invention relates to polymeric materials which are filled with lubricant fillers to reduce the coefficient of friction and increase the wear life of the polymeric material.

2. Description of the Prior Art

It is known that various solid and liquid lubricant materials can be dispersed in a polymeric matrix as by melt extrusion to reduce the coefficient of friction and increase the wear life of the polymeric matrix. It is also known that lubricant fillers can be added to a monomer or a precursor of the polymer followed by subsequent polymerization. For example, U.S. Pat. No. 3,252,905 discloses a composition in which certain low melting lubricant fillers, such as stearone and laurone, are mixed with a lactam monomer which is then polymerized to form a filled polyamide article. Since the melting point of caprolactam and laurone is about 69° C. and the melting point of stearone is only about 88° C., it is convenient to mix these lubricating fillers with the caprolactam while all of the materials are above their melting points.

When an effort was made to duplicate the results shown in the referenced patent for commercial purposes, the initial results indicated that the coefficient of friction was improved as reported in the patent but that a meaningful improvement in wear rate was not obtained. The experiments were repeated using the same materials, but under different mixing conditions, and wear rates comparable to those listed in the patent were then obtained. Microscopic examination of the test specimens revealed that the lubricant filler was in a discrete phase in the samples that showed improved wear life, whereas the lubricant filler had been thoroughly dispersed in the nylon matrix in the unimproved samples. Further investigation confirmed the fact in order to obtain improvements in wear, it was necessary to use nonintensive mixing and preserve the discrete phase of the fillers.

It is also known, as disclosed in U.S. Pat. No. 3,458,596, that when polyethylene lubricant fillers are added to nylon they must be maintained in a discrete phase to obtain substantial improvements in friction and wear. U.S. Pat. No. 3,458,596 teaches that when polyethylene is melt mixed with nylon, ultrahigh molecular weight polyethylene should be used since its melt viscosity is sufficiently high to preserve the polyethylene in a discrete phase. It has not been recognized in the prior art, however, that the principles disclosed in this patent have applicability other than in nylon/polyethylene systems.

OBJECTS OF THE INVENTION

It is an object of this invention to provide a method for incorporating low melting lubricant fillers in monomers or polymer precursors under conditions that will result in a polymerized article that will have improved properties of friction and wear.

This and other objects of this invention are achieved by mixing the lubricant fillers with the monomer or precursor of the polymeric material while all of the materials are in the liquid phase under nonintensive mixing conditions so that the discrete phase of the lubricant filler is preserved. In the preferred practice of this invention, the lubricant fillers will be present in the polymerized matrix as particles having an average mean diameter of from about 1 to 500 microns and more preferably in a range of from about 10 to 250 microns.

The following examples demonstrate the efficacy of this invention when caprolactam is filled with stearone or laurone and polymerized in a mold but it is believed to be of equal validity when other monomers or polymeric precursors are melt mixed with other low melting lubricant fillers.

In the following examples a wear factor K was determined in a test procedure that is commonly used in the plastic bearing art. In this test a ½ inch diameter journal bearing is machined from the sample to be tested into which a steel shaft is inserted for rotation. The shaft is rotated under loads measured in pounds per square inch and at velocities measured in feet per minute and the wear depth of the journal bearing is measured in inches after 200 hours. K is then calculated by substituting the recorded values in the following equation:

$$K = h/PVT$$

in which h is the wear, P is the pressure, V is the velocity, and T is the time. This results in a K number having units of $in.^3 min./ft.lb.hr.$ and, for covenience, is expressed in values of $10^{-10}$.

The limiting PV value given in the examples is an arbitrary number which indicates the PV loading under steady state conditions at which the bearing temperature reached 300° F.

It is preferred that mean average diameter of the lubricant filler be at least 1 micron and, more preferably about 10 microns. Actually, much larger diameter fillers up to as much as 500 microns perform especially well in the practice of this invention, but it is not always practical to work in this size range due to gravity separation of the filler during polymerization. Thus, the viscosity of the monomer, the time to gelation during polymerization, and the density differences may dictate that the lubricant filler be dispersed into smaller particles than those most preferred, sometimes even approaching collodial dispersions, in order to avoid gravity separation of the filler during polymerization.

While the polymer given in the examples is polycaprolactam, the invention is equally applicable to any monomer or polymer precursor that can be polymerized in a mold. These include the polyurethane instant set systems, any of the RIM (reaction injection molding) materials, and many thermosetting resins.

EXAMPLE 1

A cast piece of unfilled polycaprolactam was prepared by using anionic polymerization procedures as generally disclosed, for example, in U.S. Pat. No. 3,017,391. One molar percent of toluene disocyanate was used as an initiator and 0.75 molar percent of sodium caprolactamate was used as a catalyst. The reaction was initated at 160° C. and a solid article demolded in about 5 minutes. The measured kinetic coefficient of friction was 0.28, the limiting PV value was 8700 and the wear factor K was 143.

EXAMPLE 2

A cast piece polycaprolactam was prepared as in Example 1 except that 6% by weight stearone was added. The mixing was conducted in an intensive mixing device (Pfaudler) in which the stearone was substantially homogenized in the lactam monomer. A discrete phase of the stearone could not be identified under X 15 magnification. Samples of this cast material had a kinetic coefficient of friction of 0.16, a limiting PV value of 32,000 and a K wear factor of 148. From this experiment it can be seen that while the addition of the stearone in the dispersed phase markedly lowered the kinetic coefficient of friction and raised the limiting PV value, it did not improve the K wear factor.

EXAMPLE 3

The test procedure of Example 2 was repeated except that the mixing was accomplished with a nonintensive slow speed propellor type mixer that did not destroy the discrete phase of the stearone. In this case it was found tht the coefficient of friction was about 0.16, the limiting PV value was about 42,000, the wear factor K was 17, and the discrete phase of the stearone could be clearly identified with an average particle size of approximately 250 microns. This example clearly shows that a significant reduction in the K wear factor was obtained when the lubricant filler was present in the discrete phase.

EXAMPLE 4-7

The test procedures of Example 3 were repeated incorporating fillers in the discrete phase in a nylon matrix. The properties are tabularized below:

| Example | Filler | % Filler | Coefficient of Friction | Limiting PV | $K(10^{-10})$ |
|---|---|---|---|---|---|
| 4 | Stearone | 4 | 0.17 | 27,500 | 19 |
|   | Laurone | 4 | | | |
| 5 | Stearone | 6 | 0.16 | 42,500 | 18 |
| 6 | Stearone | 8 | 0.14 | 62,500 | 22 |
| 7 | Stearone | 10 | 0.15 | 45,000 | 14 |

While the K wear factor was lowest when 10% by weight stearone was included in the matrix, it does not appear to be practical to go beyond this filler loading as other physical properties, such as modulus and tensile strength, begin to be significantly reduced. At the other extreme, it has been found that if less than 3% by weight of a lubricant filler is used, the desired degree of improvement in friction and wear is not achieved.

As used in the claims, the term "monomer" is meant to include polymer precursors.

I claim:

1. A method for reducing friction and wear of a polymeric bearing by mixing a lubricant filler with a monomer while the filler and monomer are above their melting points and polymerizing the mixture, the improvement comprising mixing the filler and monomer under non-intensive conditions whereby the discrete phase of the filler is preserved in the polymerized product.

2. A method according to claim 1 wherein the monomer is a lactam and the filler is laurone or stearone.

3. A method according to claim 2 where the average particle size of the filler in the polymerized article is in a range of from 1 to 500 microns.

4. A method according to claim 3 wherein the average particle size of the filler in the polymerized article is from 10 to 250 microns.

5. A method for incorporating a low melting lubricant filler into a polymer comprising the steps of:
heating the lubricant filler and a monomer to above their melting points;
mixing the filler and the monomer under non-intensive conditions to preserve the discrete phase of the filler; and
polymerizing the mixture.

6. A method according to claim 1 wherein the mixture is polymerized in a mold to produce a shaped article.

7. A method according to claim 1 wherein the discrete phase of the filler in the polymeric matrix is in an average size range of from about 1 to about 500 microns.

8. A method according to claim 3 wherein the discrete phase of the filler in the polymeric matrix is in an average size range of from about 10 to 250 microns.

9. A method according to claim 1 wherein the polymer is polycaprolactam and the filler is stearone or laurone.

* * * * *